J. H. KRAMER & F. LOEBLE.
ANIMAL TRAP.
No. 179,205. Patented June 27, 1876.
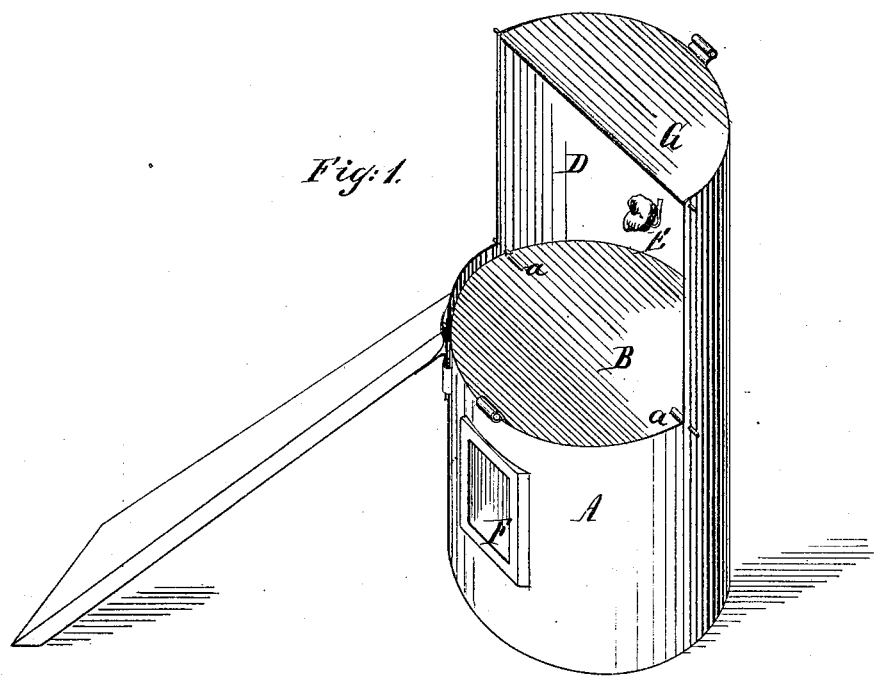
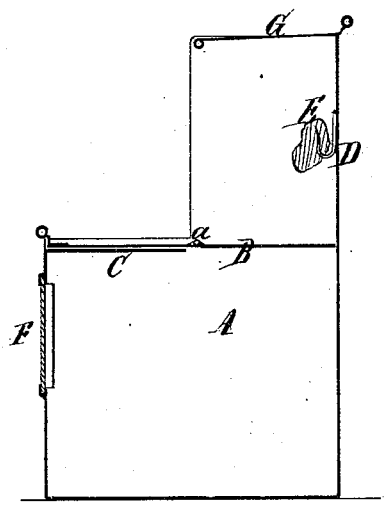
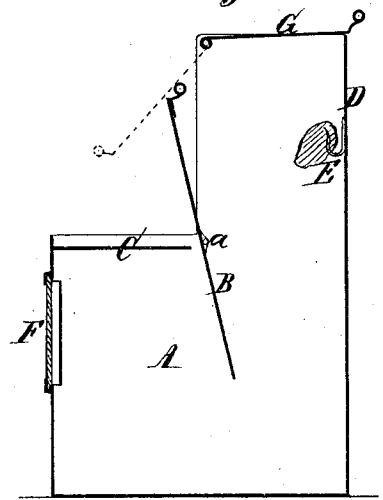
Witnesses:
Otto Ahfeland
Chas. Nahlen.
Inventors.
John H. Kramer
Friedrich Loeble
Van Santvoord & Hauff Att'ys

UNITED STATES PATENT OFFICE.

JOHN H. KRAMER AND FRIEDRICH LOEBLE, OF NEW YORK, N. Y.

IMPROVEMENT IN ANIMAL-TRAPS.

Specification forming part of Letters Patent No. 179,205, dated June 27, 1876; application filed June 15, 1876.

*To all whom it may concern:*

Be it known that we, JOHN H. KRAMER and FRIEDRICH LOEBLE, both of the city, county, and State of New York, have invented a certain new and useful Improvement in Animal-Traps, of which the following is a specification:

This invention is illustrated in the accompanying drawing, in which—

Figure 1 represents a perspective view. Fig. 2 is a vertical section, showing the trap set. Fig. 3 is a similar section, showing the trap as it appears at the time of trapping an animal.

Similar letters indicate corresponding parts.

The invention relates to a trap which is self-setting, and in which the animal is killed by drowning.

Our trap is constructed mainly of a tilting platform, having a firm and a loose end, of a water-tight tank, having a lateral sight, and of a raised bait-hook, combined in such a manner that an animal, treading on the platform, is precipitated into the tank, and if the tank is filled with water or other liquid the animal is killed by drowning, while, through the sight, the inside of the tank is laid bare, as hereinafter described.

In the drawing, the letter A designates a tank made of sheet metal or other suitable material, and preferably of a cylindrical shape, which tank is sealed on its bottom and side in such a manner that it retains water or other liquid that may be poured in it. On this tank is placed a tilting platform, B, the same being hung in the manner of such platforms a little out of its center on fulcrum-pins $a$, so that, when tilted, it has a tendency to recover its former position. The platform is fitted within the tank A, and its front portion is firmly supported on a ledge, C, extending from the pins $a$ outward under the platform. The rear portion of the platform is loose or unsupported. The ledge C not only forms a support for the platform, but also serves to close the space beneath that end of it which rises when the platform is tilted, as clearly shown in Fig. 3.

The tank A has a raised back, D, which in the present example is semi-cylindrical, and near the top of which is affixed a bait-hook, E. In order to reach this bait-hook and secure the bait, it is necessary for an animal to tread on the loose portion of the platform B, and, the latter being thus tilted, the animal is precipitated into the tank, while the platform immediately resets itself, so as to prevent the animal's escape. When a number of animals have thus been caught, water or other liquid may be poured into the tank, and thereby the animals drowned. If desired, the water may be poured into the tank before the trap is put in place, so that the animals are drowned immediately on being caught.

In the side of the tank is secured a sight, F, of glass or other transparent material, by such means that it is proof against leakage. Through this sight a person is enabled to see when and whether an animal has been caught, without necessitating a tilting of the platform for this purpose, which latter would give the animal a chance to escape.

In order to facilitate the emptying of the tank, a flap, G, is hinged to the back D, which flap can be adjusted, as shown in dotted outline in Fig. 3, so as to complete a passage from the tank, described by the back and tilting platform. By this means a trap is obtained exceedingly convenient for catching mice, rats, and other animals, as well as for killing them, and which can be furnished at a small cost.

What we claim as new, and desire to secure by Letters Patent, is—

The water-tank A, constructed with the sight F and semi-cylindrical raised top D, having the hinged top G and bait-hook E secured near the top of said raised top, in combination with the solid tilting platform B, the whole being constructed and arranged as and for the purpose specified.

In testimony that we claim the foregoing we have hereunto set our hands and seals this 30th day of October, 1875.

J. H. KRAMER. [L. S.]
FRIEDRICH LOEBLE. [L. S.]

Witnesses:
J. VAN SANTVOORD,
CHAS. WAHLERS.